(12) United States Patent
Seo et al.

(10) Patent No.: US 9,405,051 B2
(45) Date of Patent: Aug. 2, 2016

(54) BACKLIGHT ASSEMBLY AND DISPLAY DEVICE HAVING THE SAME

(71) Applicant: SAMSUNG DISPLAY CO., LTD., Yongin-si, Gyeonggi-do (KR)

(72) Inventors: Jin Seo, Osan-si (KR); Jae-Joong Kwon, Suwon-si (KR); Seul-Gi Kim, Seoul (KR); Ha-young Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/446,190

(22) Filed: Jul. 29, 2014

(65) Prior Publication Data

US 2015/0253482 A1 Sep. 10, 2015

(30) Foreign Application Priority Data

Mar. 4, 2014 (KR) .................. 10-2014-0025350

(51) Int. Cl.
*F21V 7/04* (2006.01)
*F21V 8/00* (2006.01)
*G02B 6/46* (2006.01)

(52) U.S. Cl.
CPC ............ *G02B 6/0026* (2013.01); *G02B 6/0065* (2013.01); *G02B 6/0083* (2013.01); *G02B 6/46* (2013.01); *Y10T 29/49002* (2015.01)

(58) Field of Classification Search
CPC .. G02B 6/0026; G02B 6/0065; G02B 6/0083; G02B 6/46; Y10T 29/49002
USPC ....................................................... 362/608
See application file for complete search history.

(56) References Cited

U.S. PATENT DOCUMENTS

| | | | | |
|---|---|---|---|---|
| 2007/0267600 | A1* | 11/2007 | Saruta | C09K 11/7734 252/301.4 F |
| 2012/0050649 | A1 | 3/2012 | Yeo | |
| 2012/0305971 | A1* | 12/2012 | You | H01L 33/50 257/98 |
| 2013/0050612 | A1* | 2/2013 | Hur | G02F 1/133603 349/62 |
| 2013/0108811 | A1 | 5/2013 | Wada et al. | |

FOREIGN PATENT DOCUMENTS

| | | |
|---|---|---|
| JP | 2004-031815 | 1/2004 |
| JP | 2012-119544 | 6/2012 |
| JP | 2013-115351 | 6/2013 |
| KR | 10-2005-0041547 | 5/2005 |
| KR | 10-2011-0068109 | 6/2011 |
| KR | 10-2012-0075015 | 7/2012 |
| KR | 10-2012-0075142 | 7/2012 |

* cited by examiner

*Primary Examiner* — Anh Mai
*Assistant Examiner* — Hana Featherly
(74) *Attorney, Agent, or Firm* — Innovation Counsel LLP (57) ABSTRACT

A backlight assembly includes a light source, a circuit board on which the light source is disposed, a light guide plate in which light emitted from the light source is incident on one surface and is emitted to the other surface, a bottom case configured to accommodate the light guide plate, and a wavelength conversion unit between the light source and the light guide plate. The wavelength conversion unit includes a frame having an opening, the rectangular frame including a top frame, a bottom frame and side frames extending substantially perpendicular to the top frame and the bottom frame, and connecting the top frame and the bottom frame.

17 Claims, 6 Drawing Sheets

BACKLIGHT ASSEMBLY AND DISPLAY DEVICE HAVING THE SAME

CROSS-REFERENCE TO RELATED APPLICATION

This application claims priority to and the benefit of Korean Patent Application No. 10-2014-0025350, filed on Mar. 4, 2014, with the Korean Intellectual Property Office, the content of which is incorporated herein in its entirety by reference.

BACKGROUND

1. Field

Embodiments of the inventive concept relate to a backlight assembly including a wavelength conversion unit having improved heat dissipation performance and a display device including the same.

2. Description of the Related Art

With the recent trend of low-carbon green economic growth all over the world, light emitting diodes (LEDs) which are regarded as a low-pollution eco-friendly product are being increasingly used as a backlight of various liquid crystal displays in order to reduce the energy consumption and the greenhouse gas.

A liquid crystal display (LCD) is a type of flat panel displays (FPDs), which is the most widely used these days, and is configured such that a liquid crystal layer is interposed between two substrates having electrodes, so that liquid crystal molecules of the liquid crystal layer are rearranged upon applying voltage to the electrodes, thereby adjusting the amount of transmitted light.

A liquid crystal display (LCD) which is a passive light emitting device includes a display panel for displaying an image and a backlight assembly for supplying light to the display panel. The backlight assembly is classified into three types: a direct type, an edge type, and a corner type, based on the position of a light source.

Meanwhile, a low-power high-efficiency LED has been widely used as a light source in recent years. The LED light source emits blue light, and provides white light by using other color-converting materials such as a phosphor. The blue light is later converted to the white light such that full color display is realized through a color filter of a liquid crystal panel, and thus there has been increased emphasis on research to improve color reproducibility of the blue light.

Therefore, it is suggested that a backlight assembly realizes white light with high color reproducibility by inserting a quantum dot rail between a blue LED light source and a light guide plate as a color-converting materials.

The quantum dot rail is a component to increase color reproducibility by injecting a phosphor into a glass capillary tube. The quantum dot rail is manufactured in the form of a glass tube, and thus it may have non-uniform color converting characteristics or may have decreased thermal conductivity, color reproducibility, and impact resistance.

The quantum dot rail is particularly disposed between a light source and a light guide plate, and thus it is important to effectively dissipate heat generated by the light source.

SUMMARY

Aspects of embodiments of the inventive concept are directed toward a backlight assembly including a wavelength conversion unit between a light source and a light guide plate, the wavelength conversion unit being provided with a heat dissipation unit, and a display device including the backlight assembly.

According to an embodiment of the inventive concept, a backlight assembly includes a light source, a circuit board on which the light source is disposed, a light guide plate in which light emitted from the light source is incident on one surface and is emitted to the other surface, a bottom case configured to accommodate the light guide plate, and a wavelength conversion unit between the light source and the light guide plate. The wavelength conversion unit includes a frame having an opening, the rectangular frame including a top frame, a bottom frame and side frames extending substantially perpendicular to the top frame and the bottom frame, and connecting the top frame and the bottom frame. The frame may be made of a metal.

According to an embodiment of the inventive concept, a backlight assembly includes a light source, a circuit board on which the light source is disposed, a light guide plate in which light emitted from the light source is incident on one surface and is emitted to the other surface, a bottom case configured to accommodate the light guide plate, and a wavelength conversion unit between the light source and the light guide plate. The wavelength conversion unit includes a frame having an opening, the rectangular frame including a top frame, a bottom frame and side frames extending substantially perpendicular to the top frame and the bottom frame, and connecting the top frame and the bottom frame. The frame may be made of a ceramic material.

The bottom frame may be made of a plastic or a ceramic material.

The wavelength conversion unit further may include a phosphor in the frame and a light transmission unit disposed on the opening.

The wavelength conversion unit may further include a sealing material configured to bond the light transmission unit to the frame.

The sealing material may be disposed on a step at an inner side of the frame.

The sealing material may include frit.

The backlight assembly may further include a stopper between the wavelength conversion unit and the light guide plate, and the stopper is configured to fix the wavelength conversion unit.

According to an embodiment of the inventive concept, a method of manufacturing a backlight assembly includes forming a wavelength conversion unit, arranging a light source and the wavelength conversion unit on a circuit board, and arranging a light guide plate on a bottom case, and the circuit board, on which the light source and wavelength conversion unit are disposed, on one side of the light guide plate, wherein the forming of the wavelength conversion unit includes preparing a frame having steps at an inner side thereof, and an opening in the central portion thereof, coating a sealing material on one surface of the steps, arranging a first light transmission unit on one surface of the metal frame by interposing the sealing material, coating a phosphor on the first glass to have the opening of the metal frame filled, coating the sealing material on the other surface opposite to the one surface of the steps, and arranging a second light transmission unit on the other surface of the metal frame by interposing the sealing material so as to seal the phosphor.

The method may further include a fusion bonding of the frame and the light transmission unit using laser.

According to embodiments of the inventive concept, a backlight assembly includes a wavelength conversion unit provided with a heat dissipation unit so as to improve impact resistance and heat dissipation characteristics of the wavelength conversion unit, and prevent from penetration of moisture.

The foregoing summary is illustrative only and is not intended to be in any way limiting the claims of the inventive concept. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the inventive concept will be more clearly understood from the following detailed description taken in conjunction with the accompanying drawings, in which.

DETAILED DESCRIPTION

Advantages and features of the inventive concept and methods for achieving them will be made clear from embodiments described below in detail with reference to the accompanying drawings. The inventive concept may, however, be embodied in many different forms and should not be construed as being limited to the embodiments set forth herein. Rather, these embodiments are provided so that this disclosure will be thorough and complete, and will fully convey the scope of the invention to those skilled in the art. The inventive concept is merely defined by the scope of the claims. Therefore, well-known constituent elements, operations and techniques are not described in detail in the embodiments in order to prevent the inventive concept from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

The terminology used herein is for the purpose of describing particular embodiments only and is not construed as limiting the invention. As used herein, the singular forms "a," "an" and "the" are intended to include the plural forms as well, unless the context clearly indicates otherwise. It will be further understood that the terms "comprises" and/or "comprising," when used in this specification, specify the presence of mentioned component, step, operation and/or element, but do not exclude the presence or addition of one or more other components, steps, operations and/or elements.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a backlight assembly and a display device according to an embodiment of the inventive concept will be fully described with reference to FIGS. 1 and 2. This specification includes an embodiment of a liquid crystal panel 200, but embodiments of the inventive concept are not limited thereto. In addition to the liquid crystal panel 200, any panel structure is available if it is capable of displaying an image by receiving light from a backlight assembly 400.

Figure 1:
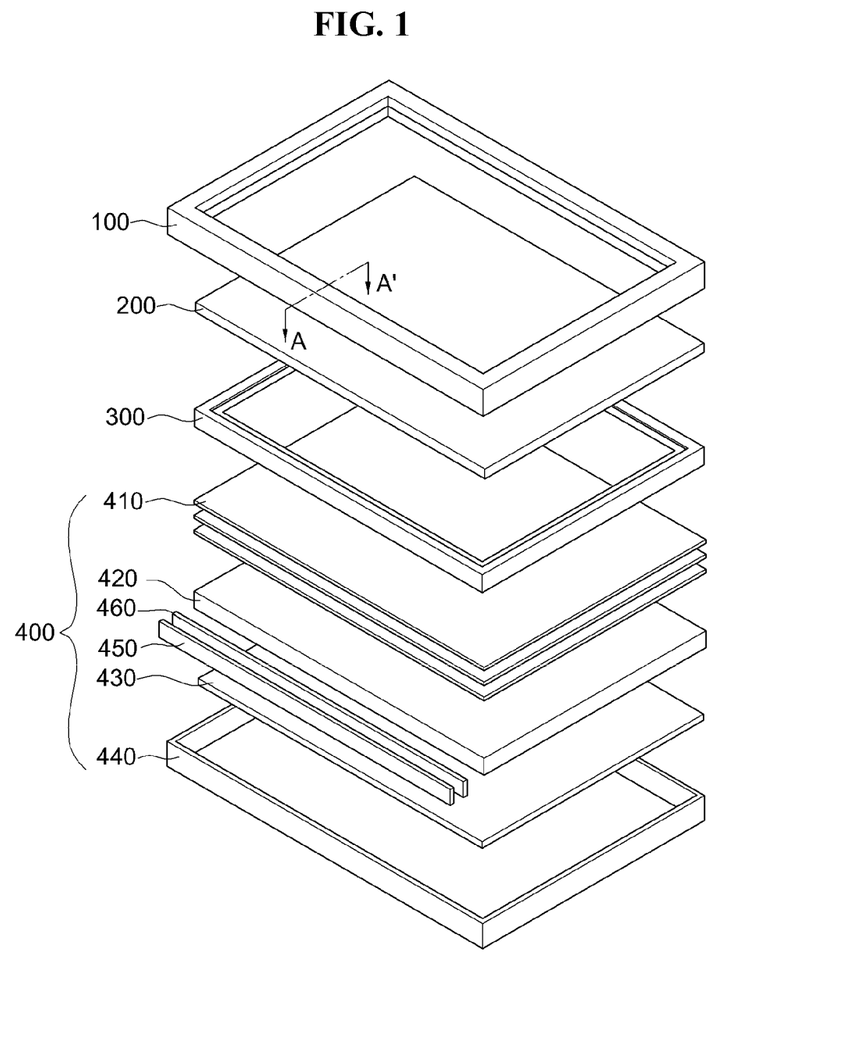
FIG. 1 is an exploded perspective view of a display device according to an embodiment of the inventive concept.

FIG. 1 is an exploded perspective view of a display device according to an embodiment of the inventive concept. FIG. 2 is a cross-sectional view taken along line A-A' of FIG. 1.

Figure 2:
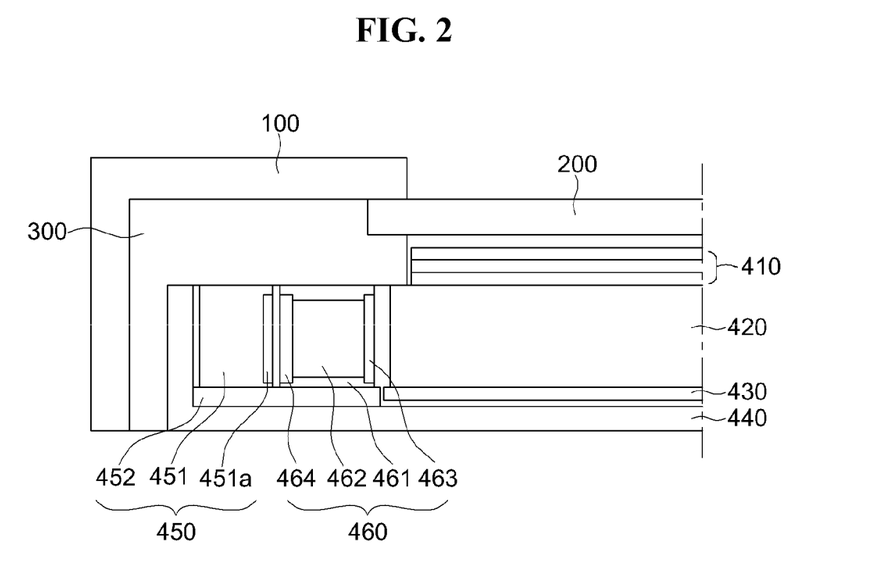
FIG. 2 is a cross-sectional view taken along line A-A' of FIG. 1.

Referring to FIGS. 1 and 2, the display device includes a liquid crystal panel 200 configured to display an image, a backlight assembly 400 configured to supply light to the liquid crystal panel 200, a top case 100 covering the liquid crystal panel 200, and a mold frame 300 configured to connect the top case 100 and a bottom case 440. The liquid crystal panel 200 is seated on the mold frame 300.

The mold frame 300 is coupled to the bottom case 440, and accommodates the liquid crystal panel 200. Such a mold frame 300 may be made of a flexible material such as plastic in order to prevent the liquid crystal panel 200 from being damaged.

The top case 100 is coupled to the mold frame 300 and the bottom case 440 so as to cover the liquid crystal panel 200 seated on the mold frame 300. The top case 100 has an open window in the central portion thereof to expose the liquid crystal panel 200.

The top case 100 may be coupled to the mold frame 300 and the bottom case 440 using hooks and/or screws. The top case 100 and the bottom case 440 may be coupled to each other in a variety of forms.

The backlight assembly 400 includes an optical sheet 410, a light guide plate 420, a reflective sheet 430, a bottom case 440, a light source unit 450, and a wavelength conversion unit 460.

The light source unit 450 includes a light source 451 and a circuit board 452 on which the light source 451 is disposed. The light source unit 450 may be disposed at a corner portion, an edge portion or a bottom portion of the light guide plate 420. That is, the light source unit 450 may emit light to the corner portion, the edge portion or the bottom portion of the light guide plate 420. That is to say, the light guide plate 420 may have a light incident side at the corner, edge or bottom.

The light source 451 may include at least one LED chip (not shown) and a package (not shown) configured to accommodate the LED chip. The light source 451 may have a light emitting surface 451a facing the light guide plate 420.

The circuit board 452 may be, for example, a printed circuit board (PCB) or a metal core PCB.

Such a light source unit 450 may be disposed on at least one corner, side surface or bottom of the light guiding plate 420. For example, the light source unit 450 may be disposed on one corner, two corners or all corners of the light guiding plate 420, may be disposed on one side surface, two side surfaces, or all side surfaces of the light guide plate 420, and may be disposed on the bottom of the light guiding plate 420 according to the size, luminance, uniformity and so on of a display panel 110.

Light emitted from the light source 451 is incident on the light-incident side of the light guide plate 420 and the light is emitted to a light emitting surface. The light guide plate 420 uniformly distributes light received from the light source unit 450 to the liquid crystal panel 200. The light guide plate 420 is disposed in the vicinity of the light source unit 450 and is accommodated in the bottom case 440. The light guide plate 420 may be provided in the form of, for example, a rectangular plate like the liquid crystal panel 200, but embodiments of the inventive concept are not limited thereto. In the case where LEDs are used as the light source 451, the light guide plate 420 may be formed in various shapes including predetermined grooves, protrusions, or the like according to the position of the light source 451.

The light guide plate 420 is described as a plate for ease of description, but it may be provided in the form of a sheet or film to achieve slimness of a display device. That is, the light guide plate 420 is to be understood as having a concept that includes not only a plate but also a film for guiding light.

The light guide plate 420 may be made of a light-transmissive material, e.g., an acrylic resin such as polymethylmethacrylate (PMMA) or polycarbonate (PC), so as to guide light efficiently.

A pattern may be formed on at least one surface of the light guide plate 420. For example, a scattering pattern (not shown) may be formed on a lower surface so as to guide the light upwards.

The optical sheet 410 is disposed on the light guide plate 420, and serves to diffuse and collect light transmitted from the light guide plate 420. The optical sheet 410 may include a diffusion sheet, a prism sheet, a protective sheet, and the like. The diffusion sheet may diffuse light received from the light guide plate 420 so as to prevent the light from being partially concentrated. The prism sheet may have triangular prisms on one surface thereof in a predetermined arrangement, and the prism sheet is disposed on the diffusion sheet so as to collect light diffused from the diffusion sheet in a direction perpendicular to the liquid crystal panel 200. The protective sheet may be disposed on the prism sheet so as to protect a surface of the prism sheet and diffuse light to obtain uniformly distributed light.

The reflective sheet 430 is disposed between the light guide plate 420 and the bottom case 440, so that light emitted downwards from the light guide plate 420 is reflected towards the liquid crystal panel 200, thereby increasing light efficiency.

The reflective sheet 430 may be made of, for example, polyethylene terephthalate (PET) having reflective properties, and one surface of the reflective sheet 430 may be coated with a diffusion layer containing, for example, titanium dioxide.

Meanwhile, the reflective sheet 430 may be made of a material containing a metal such as silver (Ag).

The bottom case 440 may accommodate the reflective sheet 430 and the light guide plate 420. A bottom surface of the bottom case 440 is disposed parallel to the light guide plate 420. The bottom case 440 may be made of a metal material having hardness such as stainless steel or a material having good heat dissipation properties such as aluminum or aluminum alloys. In this embodiment, the bottom case 440 is configured to maintain a shape of a display device and protect a variety of components accommodated in the bottom case 440.

In such a backlight assembly structure, the wavelength conversion unit 460 is disposed between the light source 451 and the light guide plate 420 in order to realize white light with high color reproducibility. Hereinafter, a wavelength conversion unit 460 having improved impact resistance and heat dissipation performance according to some embodiments of the inventive concept will be fully described with reference to FIGS. 2 to 6.

Figure 3:
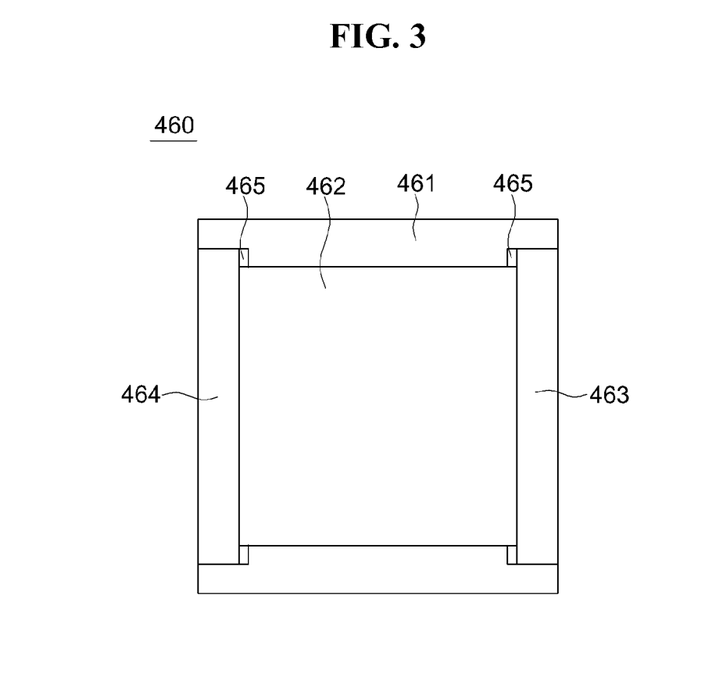
FIG. 3 is a cross-sectional view of a wavelength conversion unit illustrated in FIG. 1.
Figure 4:
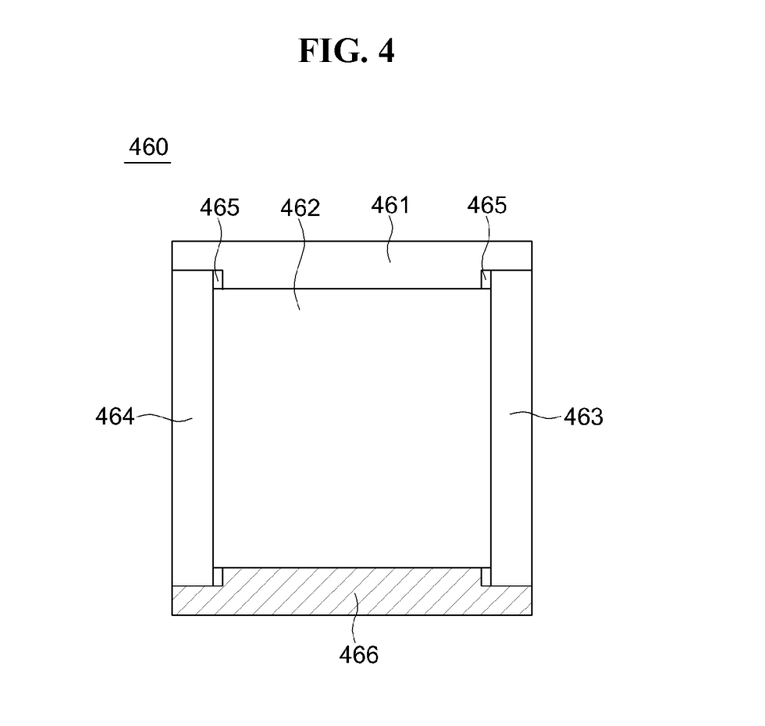
FIG. 4 is a cross-sectional view illustrating a wavelength conversion unit according to another embodiment of the inventive concept.
Figure 5:
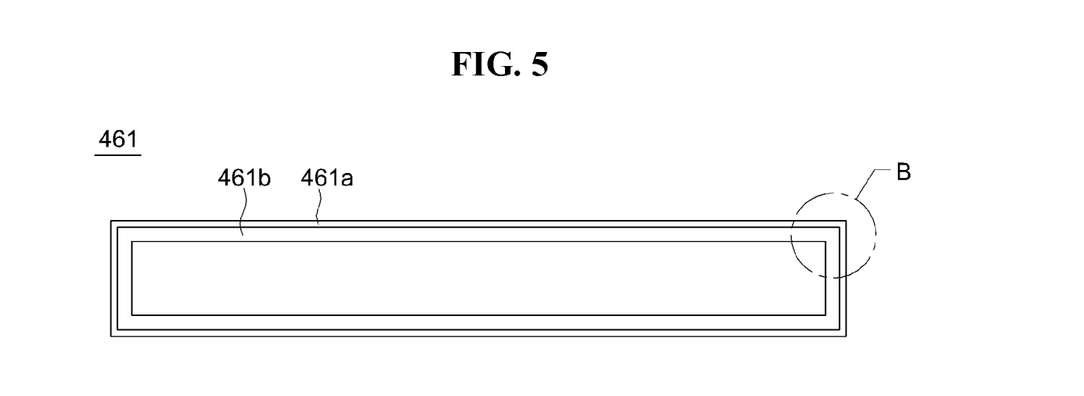
FIG. 5 is a plan view illustrating a metal frame illustrated in FIG. 3.
Figure 6:
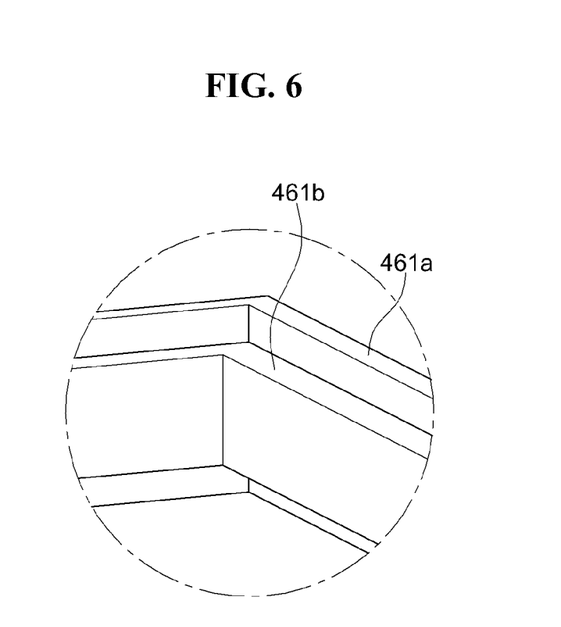
FIG. 6 is an enlarged view of area B of FIG. 5.

FIG. 3 is a cross-sectional view of the wavelength conversion unit illustrated in FIG. 1. FIG. 4 is a cross-sectional view illustrating a wavelength conversion unit according to another embodiment of the inventive concept. FIG. 5 is a side view illustrating a metal frame illustrated in FIG. 3. FIG. 6 is an enlarged view of area B of FIG. 5.

Referring to FIGS. 2 to 6, the wavelength conversion unit 460 is disposed between the light source 451 and the light guide plate 420, and is configured to convert a wavelength of light emitted from the light source 451. The wavelength conversion unit 460 includes a frame 461, a phosphor 462, a light transmission unit 463 and 464, and a sealing material 465.

The frame 461 is configured to dissipate heat generated from the wavelength conversion unit 460. For instance, as illustrated in FIG. 5, the frame 461 may be a metal frame or a ceramic frame. In the case where a plurality of light sources 451 are aligned with each other on one side of the light guide plate 420, the frame 461 may have a bar-like or line-like shape. The frame 461 illustrated in FIG. 5, for example, has a bar shape the light sources 451 are aligned with each other on one side of the light guide plate 420. The frame 461 may have various shapes according to an arrangement of the light source 451.

The frame 461 may be made of a material such as metal or ceramic, which have high thermal conductivity, so as to dissipate heat generated from the wavelength conversion unit 460.

As illustrated in FIG. 5, the frame 461 has a top frame, a bottom frame which faces the top frame and is attached to the circuit board 452, side frames facing each other, and an opening in the central portion thereof. The side frames extend substantially perpendicular to the top frame and the bottom frame, and connects the top frame and the bottom frame. As illustrated in FIG. 6, the frame 461 includes a rectangular base frame 461a which include the top frame, the bottom frame and the side frames and has an opening in the central portion thereof. The base frame 461a has a step 461b on inner sides thereof. The step 461b is an area that coated with the sealing material 465 of FIG. 3, and on which first and second glasses 463 and 464 are seated. The frame 461 may be formed of a material having good thermal conductivity such as metal and ceramic. At least the bottom frame may be formed of an electrically insulating materials such as a plastic or a ceramic material. That is, when the frame is made of a metal, the bottom frame may be a plastic or a ceramic material. The frame 461 may have a stepped portion on both side of it to accommodate a light transmission unit 463 and 464.

The phosphor 462 is disposed in the frame 461 between the first and second glasses 463 and 464, and is a substance to convert a wavelength of light emitted from the light source 451. For example, the phosphor 462 is disposed between a blue LED and the light guide plate 420, and blue light emitted from the blue LED is converted to white light by the phosphor 462.

The phosphor 462 may include quantum dots. The quantum dot may convert wavelengths of light so as to emit desired colors of light. The quantum dots may convert wavelength of light pass through them depending on the size thereof. Therefore, a diameter of the quantum dot may be adjusted according to a desired color of light.

Further, the phosphor 462 may include a green conversion particle and a red conversion particle of the quantum dots. The green conversion particle has a smaller diameter than the red conversion particle.

The quantum dots emit much stronger fluorescent light in a narrow wavelength range than a general fluorescent material, and the core of the quantum dots is composed of II-VI semiconductor nanocrystals such as CdSe, CdTe, CdS, and the like. For example, the quantum dot may have a diameter of about 2 nm to about 10 nm, and the size thereof may be adjusted where necessary.

In the case where the quantum dot has a small diameter, a wavelength of emitted light becomes shorter such that blue-based light is produced. In contrast, when the quantum dot has a large diameter, the wavelength of emitted light becomes longer such that red-based light is produced.

Further, the quantum dot may have a dual structure including an inner core and an outer shell surrounding the inner core. For instance, a CdSe/ZnS quantum dot includes an inner core made of CdSe and an outer shell made of ZnS.

Light wavelength conversion by the quantum dots will be described below in detail. For example, light emitted from a blue LED passes through the quantum dots in the wavelength conversion unit 460. The light passing through a small-sized quantum dot is converted to green light, the light passing through a large-sized quantum dot is converted to red light, and the light traveling between the quantum dots is not converted to different wavelengths. Thus, these three colors of red R, green G, and blue B of light are mixed so that white light is produced. In the above, the small-sized quantum dot may be the green conversion particle, and the large-sized quantum dot may be the red conversion particle.

Meanwhile, blue light emitted from the light source 451 passes through the red conversion particle, thereby being converted to red light, and although the converted red light passes through the green conversion particle, it remains unchanged and the red light is emitted. That is, the green conversion particle converts light of which wavelengths are at least shorter than those of green light to the green light, and thus the red light is not converted to a green light even though it passes through the green conversion particle. A band gap is formed in the quantum dot according to the size of the quantum dot so that the quantum dot transmits light with a specific wavelength without wavelength conversion when light having a long wavelength than the specific wavelength is incident.

On the other hand, in the case where blue light emitted from the light source 451 first passes through the green conversion particle, and then passes through the red conversion particle, the blue light is converted to green light by passing through the green conversion particle, and the converted green light is again converted to red light by passing through the red conversion particle. Therefore, the wavelength conversion unit 460 may obtain light of desired colors by adjusting the amount of the quantum dots including the green and red conversion particles.

The light transmission unit is configured to transmit light emitted from the light source 451, and includes the first and second glasses 463 and 464. The light transmission unit may be formed of any material having a property of transmitting light from the light source unit 450. The first and second glasses 463 and 464 are bonded to the step 461b of the frame 461 by the sealing material 465. The first and second glasses 463 and 464 may seal the phosphor 462 and prevent from water penetration, and heat generated from the wavelength conversion unit 460 may be dissipated outwards by the first and second glasses 463 and 464.

The first and second glasses 463 and 464 may include sappire or a transparent electrode material, e.g., zinc oxide, magnesium oxide, and the like, which have high thermal conductivity. The sealing material 465 may include frit.

Because the frame 461 is bonded to the first and second glasses 463 and 464 by a fusion bonding process, the wavelength conversion unit 460 may prevent from water penetration and improve heat dissipation performance.

Meanwhile, the wavelength conversion unit 460 may be disposed on the circuit board 452 as illustrated in FIG. 2. In other words, the wavelength conversion unit 460 and the light source 451 are simultaneously disposed on the circuit board 452, thereby increasing process efficiency and reducing manufacturing costs.

In the case where the wavelength conversion unit 460 is disposed on the circuit board 452, a portion of the wavelength conversion unit 460 contacting the circuit board may be formed of an insulating unit 466. The insulating unit 466 is disposed on a surface where the wavelength conversion unit 460 is in contact with the circuit board 452 so as to insulate the wavelength conversion unit 460 from the circuit board 452. For instance, as illustrated in FIG. 4, the insulating unit 466 may be a part of the frame 461. The frame 461 may be formed to include an insulating material by using double injection molding in the process of forming the frame 461. The insulating unit 466 may be made of plastic.

Meanwhile, the backlight assembly 400 may further include a stopper configured to fix the wavelength conversion unit 460. The stopper (not shown) is disposed between the wavelength conversion unit 460 and the light guide plate 420, and suppresses expansion of the wavelength conversion unit 460.

Hereinafter, a method of manufacturing a wavelength conversion unit according to an embodiment of the inventive concept will be described in detail with reference to FIGS. 7A to 7E.

FIGS. 7A to 7E are diagrams illustrating a method of manufacturing a wavelength conversion unit according to an embodiment of the inventive concept.

Figure 7A:
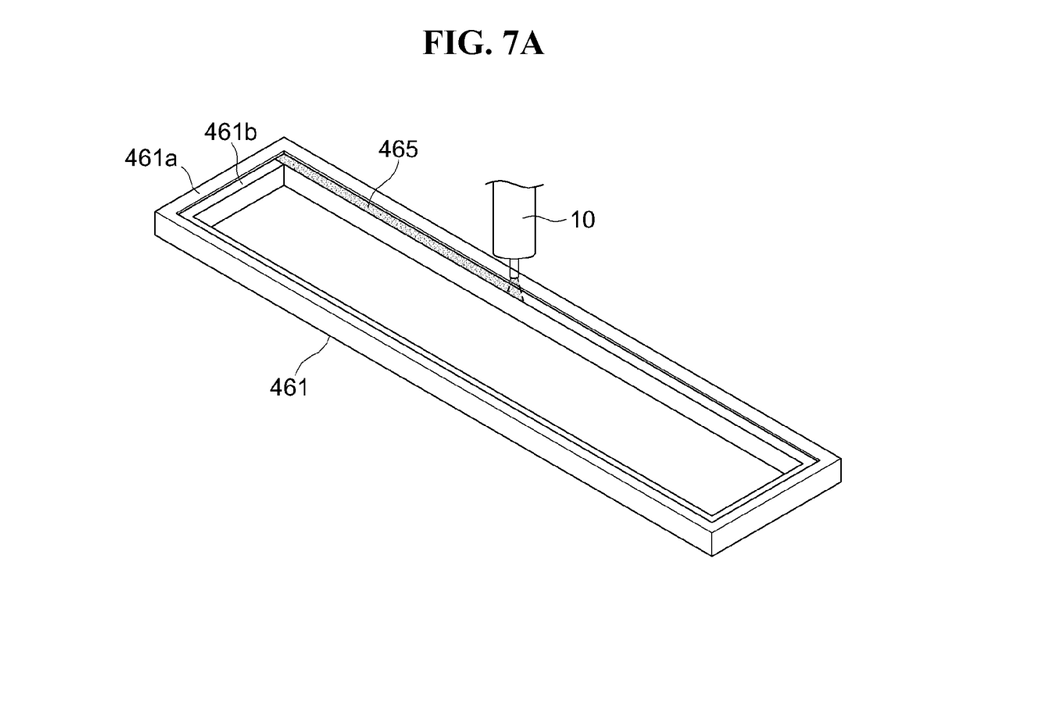
FIGS. 7A to 7E are diagrams illustrating a method of manufacturing a wavelength conversion unit according to an embodiment of the inventive concept.

As illustrated in FIG. 7A, frit is applied on one surface of a step 461b of a frame 461 using a syringe 10.

Figure 7B:
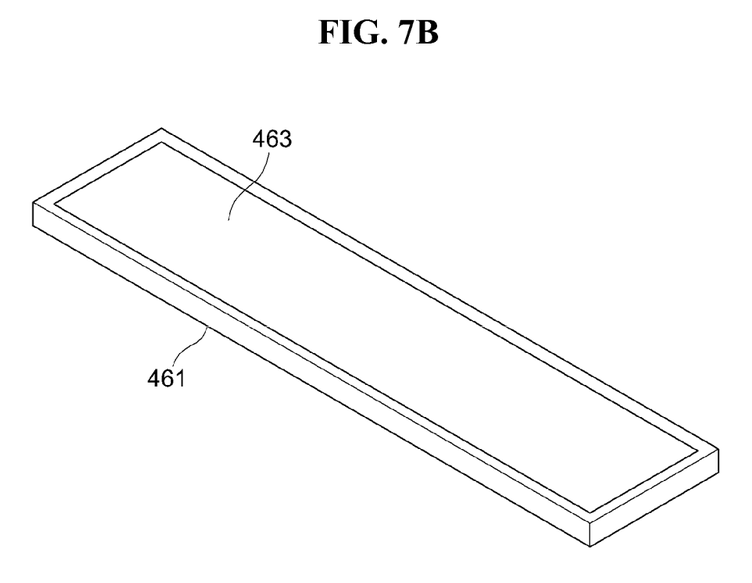

As illustrated in FIG. 7B, the frit is interposed between a first light transmission unit, for example, a first glass 463, and the frame 461 in order to bond the first glass 463 to the frame 461. The first glass 463 sealing process includes plastic bonding of the first glass 463 to the frame 461 using frit and fusion bonding of the frame 461 and the first glass 463 using laser.

Figure 7C:
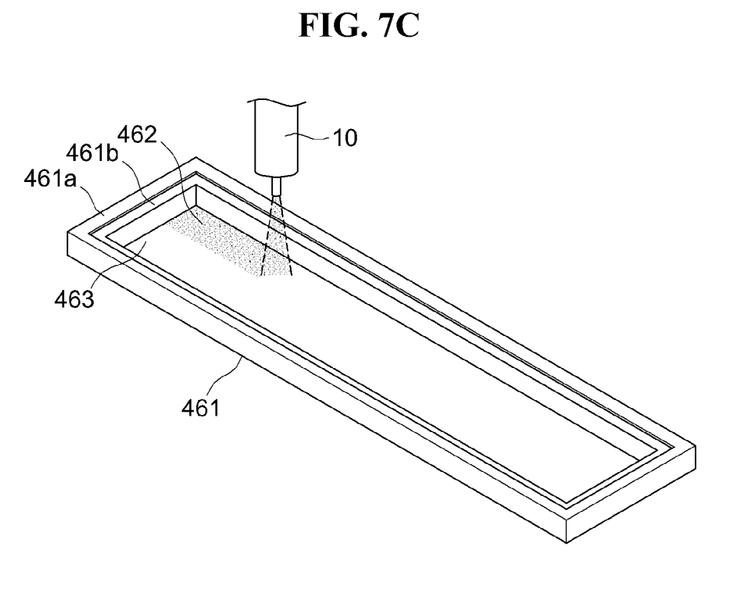

As illustrated in FIG. 7C, a phosphor 462 is applied in the frame 461 and on the first glass 463 using the syringe 10.

Figure 7D:
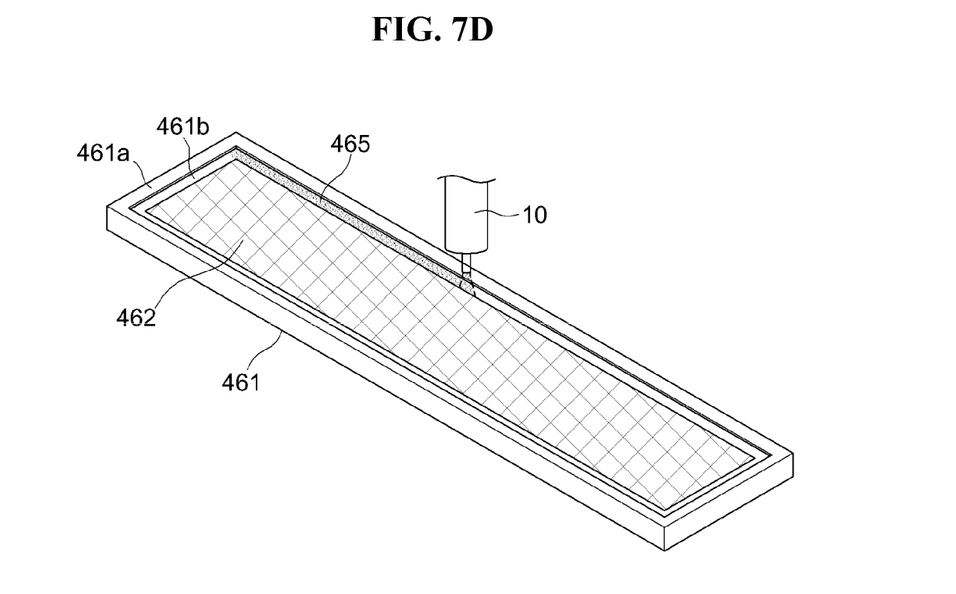

As illustrated in FIG. 7D, frit is applied on the other surface of the step 461b of the frame 461 using the syringe 10.

Figure 7E:
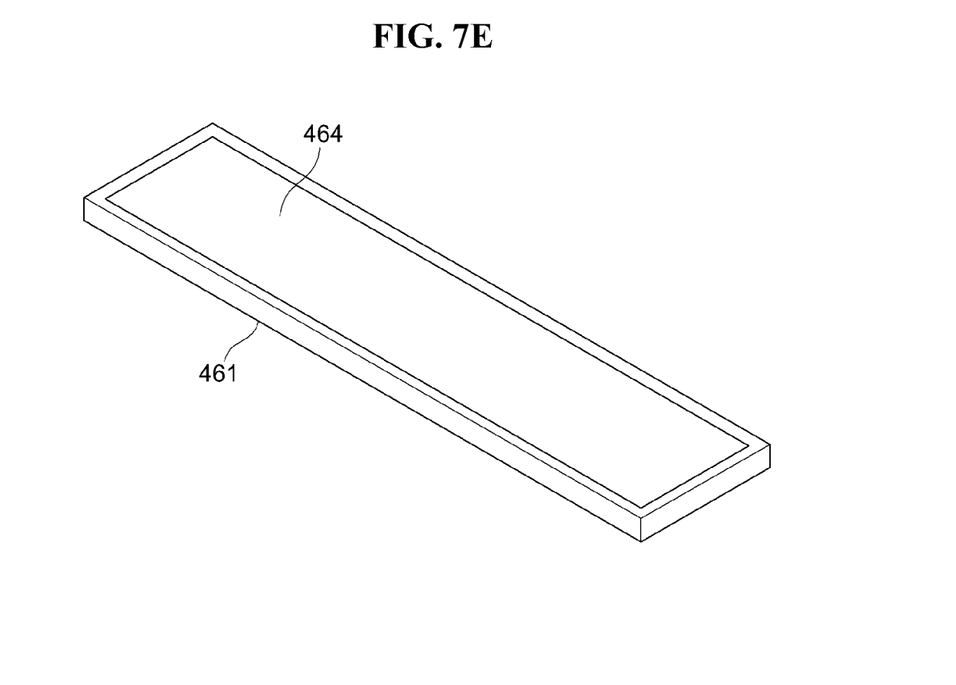

As illustrated in FIG. 7E, the frit is interposed between a second light transmission unit, for example, the second glass 464, and the frame 461 in order to bond the second glass 464 to the frame 461. The second glass 464 sealing process includes plastic bonding of the second glass 464 to the frame 461 using frit and fusion bonding of the frame 461 and the second glass 464 using laser. When the bonding of the second glass 464 is completed, the phosphor 462 is sealed, and the process of manufacturing the wavelength conversion unit is then completed.

From the foregoing, it will be appreciated that various embodiments of the inventive concept have been described herein for purposes of illustration, and that various modifications may be made without departing from the scope and spirit of the present disclosure. Accordingly, the various embodiments disclosed herein are not intended to limit the scope of the inventive concept, and the true scope and spirit of the inventive concept is indicated by the following claims, and equivalents thereof.

What is claimed is:

1. A backlight assembly comprising:
   a light source;
   a circuit board on which the light source is disposed;
   a light guide plate in which light emitted from the light source is incident on one surface and is emitted to the other surface;
   a bottom case configured to accommodate the light guide plate; and
   a wavelength conversion unit between the light source and the light guide plate,
   wherein the wavelength conversion unit includes a frame disposed between the light source and the light guide plate, wherein the frame includes a top frame, a bottom frame and side frames extending substantially perpendicular to the top frame and the bottom frame, and directly connecting the top frame and the bottom frame,
   wherein the frame is made of a metal, and
   wherein the frame has an opening in which a wavelength converting material is disposed.

2. The backlight assembly of claim 1, wherein the bottom frame is made of a plastic or a ceramic material.

3. The backlight assembly of claim 2, wherein the wavelength conversion unit further comprises a phosphor in the frame and a light transmission unit disposed on the opening.

4. The backlight assembly of claim 3, wherein the wavelength conversion unit further comprises a sealing material configured to bond the light transmission unit to the frame.

5. The backlight assembly of claim 4, wherein the sealing material is disposed on a step at an inner side of the frame.

6. The backlight assembly of claim 5, wherein the sealing material includes frit.

7. The backlight assembly of claim 4, wherein the sealing material includes frit.

8. The backlight assembly of claim 2, wherein the wavelength conversion unit further comprises a phosphor in the frame and a light transmission unit disposed on the opening.

9. The backlight assembly of claim 8, wherein the wavelength conversion unit further comprises a sealing material configured to bond the light transmission unit to the frame.

10. The backlight assembly of claim 9, wherein the sealing material is disposed on a step at an inner side of the frame.

11. The backlight assembly of claim 1, further comprising a stopper between the wavelength conversion unit and the light guide plate, the stopper being configured to fix the wavelength conversion unit.

12. A backlight assembly comprising:
    a light source;
    a circuit board on which the light source is disposed;
    a light guide plate in which light emitted from the light source is incident on one surface and is emitted to the other surface;
    a bottom case configured to accommodate the light guide plate; and
    a wavelength conversion unit between the light source and the light guide plate,
    wherein the wavelength conversion unit includes a frame disposed between the light source and the light guide plate wherein the frame includes a top frame, a bottom frame and side frames extending substantially perpendicular to the top frame and the bottom frame, and directly connecting the top frame and the bottom frame,
    wherein the frame is made of a ceramic material, and
    wherein the frame has an opening in which a wavelength converting material is disposed.

13. The backlight assembly of claim 12, wherein the wavelength conversion unit further comprises a phosphor in the frame and a light transmission unit disposed on the opening.

14. The backlight assembly of claim 13, wherein the wavelength conversion unit further comprises a sealing material configured to bond the light transmission unit to the frame.

15. The backlight assembly of claim 14, wherein the sealing material is disposed on a step at an inner side of the frame.

16. The backlight assembly of claim 15, wherein the sealing material includes frit.

17. The backlight assembly of claim 14, wherein the sealing material includes frit.

* * * * *